United States Patent [19]

Smith et al.

[11] Patent Number: 4,529,139
[45] Date of Patent: Jul. 16, 1985

[54] METHOD OF MANUFACTURING A FILAMENT WOUND ARTICLE

[75] Inventors: Dale E. Smith, Windsor; Warren H. Pinter, East Hartland, both of Conn.

[73] Assignee: United Technologies Corporation, Hartford, Conn.

[21] Appl. No.: 198,754

[22] Filed: Oct. 20, 1980

[51] Int. Cl.³ .............................................. B65H 81/08
[52] U.S. Cl. .................................... 242/7.02; 156/169; 156/172; 156/173; 156/175; 156/425; 242/7.21
[58] Field of Search ................ 242/7.02, 3, 7.21, 7.22, 242/7.23, 7.13, 178; 156/169, 172, 173, 185, 187, 195

[56] References Cited

U.S. PATENT DOCUMENTS

| Re. 30,489 | 1/1981 | Abbott | 242/7.21 X |
|---|---|---|---|
| 2,594,693 | 4/1952 | Smith | 57/76 |
| 2,987,217 | 6/1961 | Reed | 220/66 |
| 3,123,313 | 3/1964 | Reed | 247/7 |
| 3,143,306 | 8/1964 | Dijkmans et al. | 242/7.21 |
| 3,202,560 | 8/1965 | Michael | 156/162 |
| 3,255,889 | 6/1966 | Goldman et al. | 242/178 X |
| 3,386,872 | 6/1968 | Medney | 156/173 |
| 3,677,851 | 7/1972 | Kayser | 156/73 |
| 3,765,979 | 10/1973 | Thomas | 156/173 |
| 4,080,915 | 3/1978 | Bompard et al. | 242/7.21 X |
| 4,251,036 | 2/1981 | McLain | 242/7.21 |

Primary Examiner—Billy S. Taylor
Attorney, Agent, or Firm—John Swiatocha

[57] ABSTRACT

Elongate articles of non-circular cross section such as those of an airfoil cross section are constructed by winding filamentary material in layers about a form between a pair of spaced turnarounds generally conforming in shape to the cross sectional shape of the form. Adjacent layers are continuously wound by winding the filamentary material across the edges and outer face of each turnaround while reversing the direction of relative longitudinal displacement between the filamentary material and the form. The shape correspondence between the turnarounds and the form effect a minimization of expanse between the turnaround edge and form surface, thereby minimizing bridging of the filamentary material between those two members.

6 Claims, 7 Drawing Figures

METHOD OF MANUFACTURING A FILAMENT WOUND ARTICLE

TECHNICAL FIELD

This application relates in general to a method of manufacturing an article by filament winding and more particularly to such a method employed in the manufacture of articles of non-circular cross section such as airfoils and the like.

BACKGROUND ART

In modern manufacturing methods, for the production of articles of enhanced strength, filament winding techniques are often employed. Such techniques involve the winding of high strength filaments disposed in a matrix of binder material about a form or mandrel of a shape generally corresponding to the required shape of the finished article, and then curing the matrix material. In the case of the manufacture of an elongate article such as an airfoil by such filament winding techniques, as the filaments are wound around the form, the form and filaments are reciprocally displaced relative to one another along the form's longitudinal or winding axis, thereby forming a plurality of layers of filamentary material, the filaments of each layer being angularly offset from the longitudinal and transverse axes of the form as well as from the filaments of adjacent layers. To achieve a continuous reciprocation of the filaments along the form as the filaments are wound thereon, it is the practice to employ turnarounds or winding rings at the ends of the form or the segment of the form being wound, overlying end turns of the various layers being constructed by winding the filaments over the edges and across an outer face of the winding ring while reversing the direction of the longitudinal displacement between the fibers and the form.

In the prior art, turnarounds functioning as described hereinabove, have been of circular or disc shapes, and the offset angle between filaments of adjacent layers and the spacing of individual filament turns within a single layer define a uniform, longitudinal reciprocating motion between the filaments and the form as the filaments are wound around the form. That is, the angular orientation and spacing of the filament turns in the various filamentary layers define, by way of the uniform reciprocating motion between the filaments and form, a multiplicity of secants of uniform length and disposition across the surface of the turnaround. If the form is of a cross sectional configuration wherein the cross sectional width is greater than the thickness, as is the case wherein the cross section is defined by an airfoil shape, it will be understood that in such prior art methods, substantial bridging occurs between the outer edge of the turnaround and the form surface or filamentary layers wound thereon. Such bridging is, of course, merely wasted material which must be removed from the finished article by subsequent machining operations or the like. Moreover, the bridging requires the turnaround to be spaced from the location of the end of the completed article. Thus, equipment used to wind the filaments on the form must be capable of travel in excess of that which would be required if such bridging were somehow avoided. It is, of course, appreciated that this excess travel capability adds to the size and cost of such winding equipment and therefore, the manufacturing costs of the finished article.

DISCLOSURE OF INVENTION

It is therefore an object of the present invention to provide a method for manufacturing a wound article wherein filamentary bridging between a turnaround and an associated form or the fibers wound thereon is minimized.

It is another object of the present invention to provide such a method wherein the required longitudinal travel capabilities of filament winding machinery are minimized.

It is another object of the present invention to provide such a method wherein material wastages and cost of the wound article are minimized.

In accordance with the present invention, these and other objects are achieved by an improved method for manufacturing a filament wound article of non-circular cross section wherein the article is wound from filamentary material in a plurality of overlying layers between a pair of spaced turnarounds conforming generally to the cross sectional shape of the form whereby bridging between the turnaround edge and the form or the fiber layers wound thereon is minimized, thereby enhancing the ease of manufacture and economy of construction of the wound article and minimizing the cost of equipment employed in the winding process. Where the turnaround is employed at the ends of the form, and the form has no sharp edges, the turnaround may be generally coextensive with the form end cross section whereby filamentary bridging is substantially eliminated. Where the form is employed between the form ends or with a form having a sharp edge, the turnaround, while conforming to the cross sectional shape of the form at the location of the turnaround, extends slightly outwardly from the form. In the preferred embodiment, the winding of the filamentary material about the form is achieved by a rotation of the form relative to the filamentary material, such form rotation being provided by the rotation of a shaft on which the form is mounted. The shaft extends outwardly from the outer faces of the end turnarounds, slack in the filamentary material wound around the turnaround being taken up by a winding of the filamentary material at least partially around the shaft as the material is wound across the outer turnaround face.

The foregoing, and other features and advantages of the preset invention, will become more apparent from the following description and accompanying drawing.

BEST MODE FOR CARRYING OUT THE INVENTION

Figure 1:
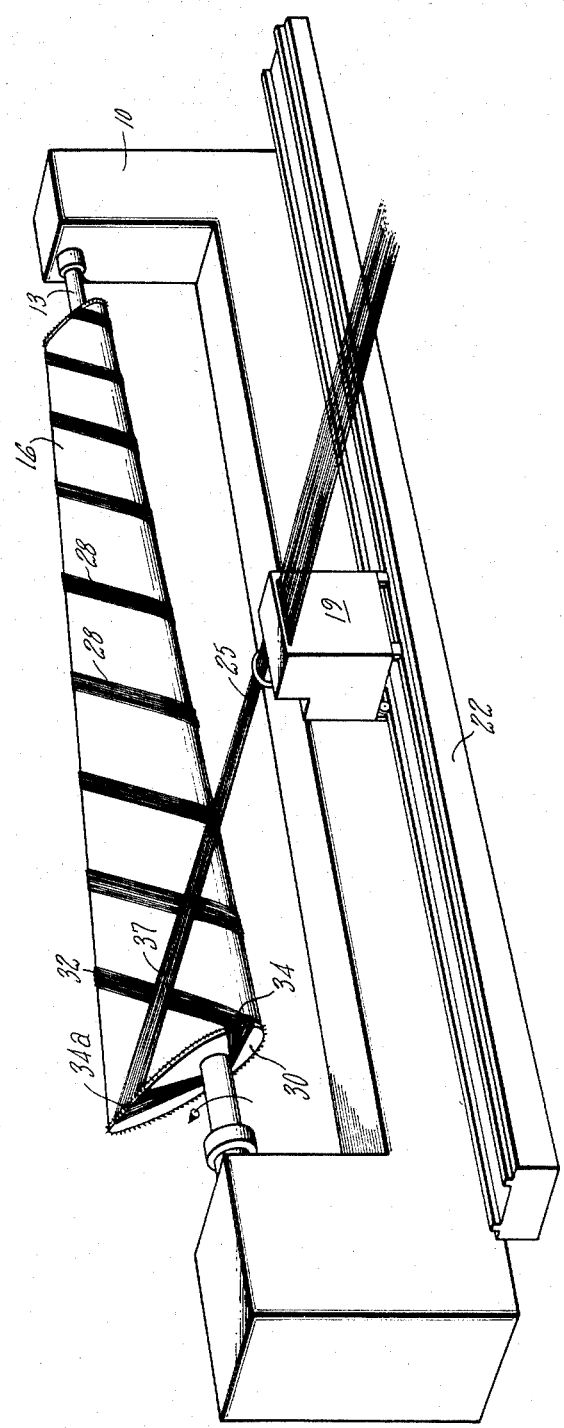
FIG. 1 is a perspective view of an article being constructed by a method of filament winding in accordance with the present invention.

Referring to FIG. 1, there is illustrated a method of manufacturing an article of non-circular, elongate cross section by the method of the present invention, in this case, the article being an elongate airfoil blade such as employed in large wind turbines. The method is practiced on a winding machine 10 comprising a rotatable shaft 13 on which a form 16 is mounted such that the form rotates with the shaft about the form's longitudinal or winding axis. Winding machine 10 also includes a carriage or winding head 19 which traverses the length of the winding machine by reciprocable rectilinear motion along tracks 22. Winding head 19 receives filamentary material or rovings 25 such as glass fibers or the like from a suitable source thereof and coats the fibers with a suitable binder such as an epoxy or other appropriate substance such that each fiber is coated with the binder, the fibers collectively being disposed within a matrix of binder in a fashion well known in the art. In the preferred embodiment, the fibers are applied to the form in a band of juxtaposed fibers. However, it will be appreciated that the fibers may be applied in single strands or bundles without departing from this invention.

The airfoil formed in accordance with the present invention, comprises a plurality of wound layers of the filamentary material, the first or innermost one of such layers being shown in FIG. 1. It will be noted that the layers comprise a plurality of generally parallel spaced turns 28, the turns being angularly offset with respect to the longitudinal and transverse axes of the form. It will be understood that such angular orientation of the turns is produced by the longitudinal motion of the winding head with respect to the form, the velocity of the winding head relative to the rotational velocity of the form determining the angular orientation of the turns. In winding the first or innermost layer, ends of the filaments treated with binder are secured to an end of the form and the form is rotated about its longitudinal axis as the winding head traverses the length of the form. As the winding head approaches turnaround 30, it lays down an end turn 32 of the filamentary material. As the winding head passes the end of the form, the filaments are captured by one or more spikes 34 outstanding from the edge of turnaround 30. After passing the turnaround, the winding head reverses direction thereby winding the filaments across the outer face of the turnaround, whereupon the fibers are captured by a number of spikes 34a displaced from spikes 34 on which the filaments were first captured. As the winding head begins its traversal of the form in the opposite direction, an end turn 37 overlying and angularly offset from end turn 32 is layed down. Continued traversal of form 16 by winding head 19 while the form rotates on spindle 13, produces a second layer of spaced turns of the filamentary material. This reciprocating traversal of the form by the winding head is repeated until the required number of layers are built up on the form.

Figure 2:
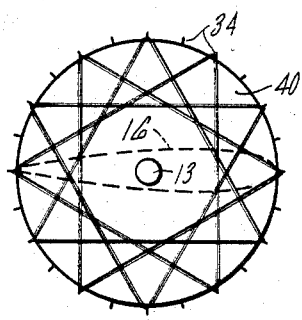
FIG. 2 is a plan view of a prior art circular turnaround being employed in the filament winding of an airfoil shape.
Figure 3:
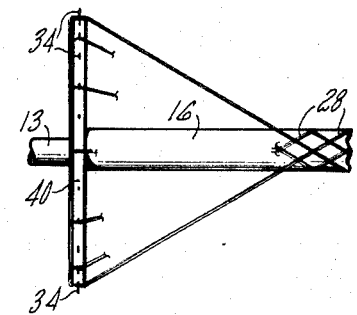
FIG. 3 is a side elevation of an airfoil being wound in accordance with the method of winding shown in FIG. 2.

As shown in FIG. 2, the turnarounds employed in the prior art have been of circular shape. Referring to FIG. 2, there is shown a prior art substantially circular turnaround 40 fixed to the end of airfoil form 16 in any suitable manner. A plurality of spaced outstanding spikes 34 are affixed to the edge of turnaround 40, the spikes serving to engage the continuous band of filamentary material for wrapping or winding the band over the outer face of the turnaround in the manner described hereinabove. As shown in FIG. 2, the diameter of the turnaround equals or exceeds the width of the airfoil form. As further shown in FIG. 2, the winding of successive filament layers on form 16 results in a plurality of windings across the face of prior art turnaround 40, such windings comprising a multiplicity of secants of generally uniform length and relative angular disposition. Thus, it will be seen that a uniform rotation of form 16 combined with a uniform reciprocation of the winding head will result in the uniform distribution of filamentary material secants on turnaround 40 as shown in FIG. 2. However, when the form is substantially wider than it is thick, such as airfoil form 16 shown in the drawings, substantial bridging of the filamentary material between the edge of the turnaround and the form and fiber layers built up thereon, results. It is, of course, apparent that such bridging is of no use in the finished product and must be severed therefrom at the completion of the winding operation, thereby contributing to the manufacturing costs of the product. Moreover, the material forming the bridging is wasted and cannot be reused in subsequent winding operations. This, of course, also contributes significantly to the cost of the wound article. By way of example, in the construction of a large airfoil blade wherein the blade thickness may be as little as 12% of the width (chord), the mass of the wasted bridging material may be greater than the final weight of the wound article. Moreover, the bridging requires the spacing of the turnaround a substantial distance from the location corresponding to the end of the wound article. Thus, where such bridging occurs, winding machines of greater length than those which would be required if no bridging occurs further contribute to the cost of the wound article.

Figure 4:
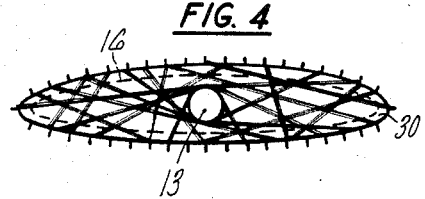
FIG. 4 is a plan view of a turnaround conforming generally to a form employed in the filament winding of an airfoil in accordance with the present invention.
Figure 5:
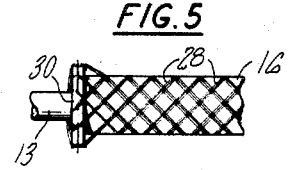
FIG. 5 is a side elevation of an airfoil being wound in accordance with the present invention as illustrated in FIGS. 1 and 4.

To overcome the deficiencies of such prior art winding techniques, in the method of the present invention as shown in FIGS. 1, 4 and 5, the turnaround "conforms" generally to the cross sectional shape of the form. In this sense, "conforms" shall mean that the turnaround and form are either completely or in part, coextensive or that the perimeters of these two members are of similar non-circular shape. Where the turnaround and form are not entirely coextensive, the term "conform" shall imply that the non-coextensive turnaround portion extends only slightly outwardly from the form so that the turnaround edge and form surface are in close proximity to each other. Referring to FIGS. 1, 4 and 5, turnaround 31 comprises a generally planar member substantially conforming in shape to the cross section of the form and attached thereto by any suitable means. Like the prior art turnarounds, turnaround 30 is provided at the edge thereof with outstanding spikes 34 which capture the filamentary bands for the winding of the bands across the turnaround face. Referring to FIG. 5, it will be seen that the close conformance between the turnaround employed in the present invention and the form results in a minization of bridging between the form and the completed filamentary layers thereon and the edge of the turnaround. Thus, for a given article length, the required length of the winding machinery employed in the manufacture of that article is reduced to substantially the length of the article itself. Moreover, the wastage of both filaments and binder is substantially reduced since very little bridging results. To prevent a separation of the filaments within a band by the turnaround edge, the turnaround is rounded and extends slightly outwardly from the form. However, it will be understood that where the form includes no sharp edges, the turnaround may conform exactly to and be generally coextensive with the cross sectional shape of the form. Thus, for such exact conformance, bridging is substantially eliminated, thereby eliminating entirely the material wastage due to bridging and the requirement of post-winding operations to remove the bridged material from the finished article.

Figure 6:
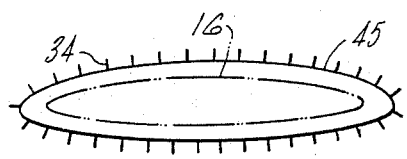
FIG. 6 is a plan view of a turnaround employed between the ends of a filament winding form in accordance with the method of the present invention.
Figure 7:
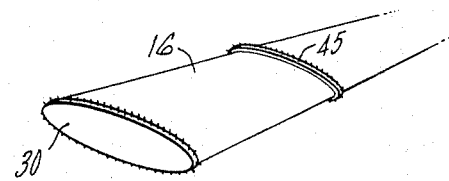
FIG. 7 is a perspective view of the placement of the turnaround shown in FIG. 6 on a winding form in accordance with the present invention.

Referring to FIG. 4, it will be seen that unlike prior art turnaround 40 shown in FIG. 2 wherein the filaments would thereover occupy locations of uniform secants, the filaments wound across the face of turnaround 30 are of varying lengths and varying relative angular disposition. Accordingly, it will be seen that such non-uniformities may require variations in winding head movement in the areas of the turnaround. Thus, winding head travel past the turnaround as well as winding head velocity in the area of the turnaround may require variation to take up filament slack and position the filaments in the desired manner across the turnaround face. Of course, other variations in winding machine head travel such as vertical winding head movement may be required. Likewise, winding head travel which causes the filaments to wind about shaft 13 for purposes of taking up slack may be employed. While such non-uniform movement of the winding head was not capable of control in the prior art, thereby dictating the use of circular turnarounds, modern numerical control equipment employed with such winding machines as discussed herein can, when provided with information relating to the form cross sectional shape, the speed of rotation, and the angular disposition of the fibers relative to the transverse axis automatically control the winding head to achieve the required disposition of the filamentary material across the turnaround face.

Where the article being wound is to be of a tapered shape, such tapering is achieved by decreasing the number of wound layers from the widest end of the article to the narrowest end. It will be understood then, that for such a winding technique, turnarounds will be required between the ends of the form at locations separating a portion of the article having a particular number of wound layers from an adjacent portion having a lesser number of such wound layers. Referring to FIGS. 6 and 7, such a turnaround is shown at 45. In keeping with the present invention, turnaround 45 conforms with the cross sectional shape of form 16. However, unlike turnaround 30 which for optimal bridging minimization is made to dimensionally correspond to the cross sectional shape of the form, turnaround 45 extends outwardly to a sufficient extent to accommodate the filamentary material wound across the face of the turnaround between the outer edge thereof and the form. The amount of filamentary material so accommodated will, therefore, determine the outward extension of the turnaround from the form. However, it has been determined that for winding large, tapered airfoil shapes such as those of the blades of large wind turbines, where the filamentary material is wound on the form in a band shape, the turnaround extends outwardly from the form at the leading edge and major surfaces thereof, a distance approximately equal to one-half the width of the band and has a radius of curvature at the trailing edge approximately equal to the band width. While it is noted that the outward extension of the turnaround from the form surface necessarily causes some bridging, since the outward extension is only one-half the width of the band, it will be appreciated that such bridging is substantially reduced from that caused by prior art circular turnarounds wherein the turnaround would extend outwardly from the form a distance up to seven times the thickness of the form. Like shaft 13, the form itself may be employed as a means of taking up slack in the filamentary material.

Accordingly, it will be seen that the method of manufacturing wound articles of the present invention substantially minimizes the bridging of filamentary material between the edge of the turnaround and the form. As discussed hereinabove, such bridging minimization serves not only to minimize fiber and binder waste, but also minimizes the machining required of the article subsequent to winding as well as the required capacity of machinery employed to wind the article.

Although this invention has been shown and described with respect to detailed embodiments thereof, it will be understood by those skilled in the art that various changes in form and detail thereof may be made without departing from the spirit and scope of the claimed invention. Accordingly, although the invention has been described in the environment of airfoil manufacturing techniques, it will be understood that the method of this invention may be employed with equal utility in the winding of any elongate shape.

We claim:

1. In a method of manufacturing an article of non-circular, elongate cross section by winding a plurality of overlying layers of filamentary material about a form between a pair of spaced turnarounds while effecting a reciprocating displacement of said filamentary material and form along a winding axis through said form, overlying end turns of adjacent layers being formed by winding said filamentary material about said form while said filamentary material and form are relatively displaced in a first direction along said winding axes, and subsequently winding said filamentary material across an outer face of said turnaround engaging the edges thereof while reversing the direction of displacement of said filamentary material and form, the improvement characterized by providing said turnarounds with a shape conforming generally to the cross sectional shape of said form, said conformance in shape between said turnaround and form providing minimal filamentary bridging between the edges of said turnarounds and said form along major portions of the perimeters thereof.

2. The method of claim 1 wherein said non-circular elongate cross section comprises an airfoil shape.

3. The method of claim 2 wherein said airfoil shape includes leading and trailing edges and wherein the leading and trailing edges of said turnaround and form are generally coincident.

4. The method of claim 1 wherein said filamentary material is wound about said form in a continuous band comprising a plurality of generally juxtaposed filaments and wherein said turnaround, about a major portion thereof, extends outwardly from said form a distance approximately equal to one-half the width of said band.

5. The method of claim 4 wherein said turnaround and form cross section are of an airfoil shape characterized by opposed leading and trailing edges, the trailing edge of said turnaround having a radius of curvature approximately equal to the width of said band.

6. The method according to claim 1 wherein said form is mounted on a shaft having a longitudinal axis generally colinear to said winding axis, said shaft projecting outwardly from said turnaround outer face such that slack in said filamentary material is taken up by a winding thereof around said shaft as said filamentary material is wound across said turnaround outer face.

* * * * *